Patented Mar. 4, 1930

1,749,513

UNITED STATES PATENT OFFICE

HUGO SCHWEITZER, OF WIESDORF, NEAR COLOGNE-ON-THE-RHINE, GERMANY, ASSIGNOR TO GENERAL ANILINE WORKS, INC., OF NEW YORK, N. Y., A CORPORATION OF DELAWARE

TRISAZO DYESTUFFS AND PROCESS OF PRODUCING THEM

No Drawing. Application filed February 4, 1927, Serial No. 166,009, and in Germany February 26, 1926.

In United States Patent No. 1,602,991 there have been described processes for the manufacture of trisazo dyestuffs comprising coupling the diazo compounds of secondary disazo dyestuffs, containing in the end position 1-amino-2-naphthol-ethyl-ether-6-sulphonic acid, with 2-amino-5-naphthol-7-sulphonic-acid or 2-aryl-amino-5-naphthol-7-sulphonic acid, in the presence of pyridine or a derivative or homologue thereof.

The said secondary disazo dyestuffs may be represented broadly by the general formula:

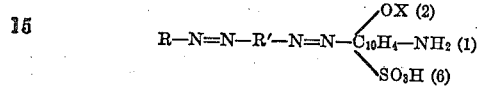

wherein R and R' represent residues of the benzene or naphthalene series or their sulfonic acids, and X represents alkyl.

The present invention concerns a further development leading to the production of similar valuable dyestuffs and is based upon my discovery of the fact that there may be substituted for the 2-amino-5-naphthol-7-sulphonic acid, or 2-arylamino-5-naphthol-7-sulphonic acid, other derivatives of the 2-amino-5-naphthol-7-sulphonic acid. Thus, for example, 2-alkyl-amino-5-naphthol-7-sulphonic acids, 2-aralkylamino-5-naphthol-7-sulphonic acids, 2-aroyl-amino-5-naphthol-7-sulphonic acids or their substitution products may be employed and, further, 5.5'-dihydroxy-7.7'-disulfo-2.2'-dinaphthyl-urea, having most probably the formula:

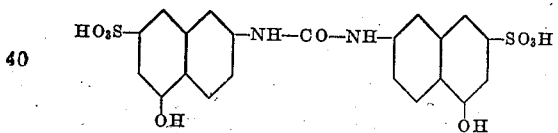

5.5'-dihydroxy-2.2'-dinaphthylamine-7.7'-disulphonic acid, m-and p-amino-phenyl-1.2-naphthimidazol-5-hydroxy-7-sulphonic acids having most probably the formula:

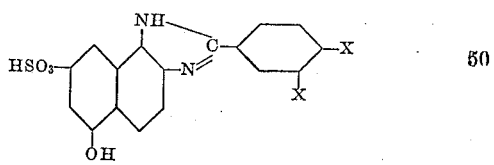

wherein X represents hydrogen or $-NH_2$, one X being hydrogen, and one X being $-NH_2$, m- and p-amino-phenyl-1.2-naphthothiazol-5-hydroxy-7-sulphonic-acids having most probably the formula:

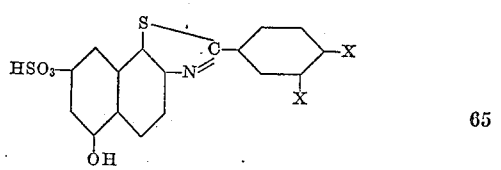

wherein X represents hydrogen or $-NH_2$, one X being hydrogen, and one X being $-NH_2$ and the like.

The above-mentioned derivatives of 2-amino-5-naphthol-7-sulphonic acid may be represented broadly by the general formula:

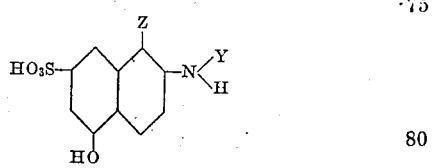

wherein Z represents hydrogen or the second heterocyclic atom in one of the grouping thiazole or diazole in which the nitrogen atom in the 2-position is the first heterocyclic atom, and in which Y represents one of the residues, alkyl, aralkyl, aroyl, aminoaryl or the carbon atom of the thiazole or diazole ring.

The following examples illustrate the invention:

Example 1

75.1 parts by weight of the sodium salt of the dyestuff aniline-3.6-disulphonic acid-azo-α naphthylamine-azo-1-amino-2-naphthol ethyl ether-6-sulphonic acid, obtained in the customary manner, are diazotized. The resulting diazo compound is then caused to run into an ice cold solution of 26.7 parts by weight of 2-ethyl-amino-5-naphthol-7-sulphonic acid in 50 parts of water and 100 parts by weight of pyridine. When the coupling is complete, the dyestuff is worked up according to the customary methods. The finished dyestuff, having most probably the formula:

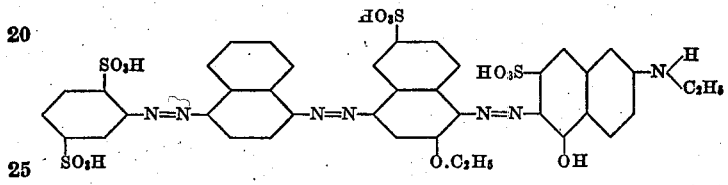

is soluble in water, readily soluble in concentrated sulfuric acid with a blue coloration, and yields, upon careful reduction with stannous chloride and hydrochloric acid:
Aniline-3.6-disulphonic acid,
1-4-naphthylenediamine,
1-4-diamino-2-naphthol-ethyl ether-6-sulphonic acid, and
2-ethyl-amino-5-hydroxy-6-naphthylamine-7-sulphonic acid.

It dyes cotton in clear greenish blue shades of good fastness properties.

By replacing the 2-ethyl-amino-5-naphthol-7-sulphonic acid of the foregoing example by 2-diethyl-amino-5-naphthol-7-sulphonic acid or by 5.5'-dihydroxy-2.2'-dinaphthylamine-7.7'-disulphonic acid or by the carbonyl-2-amino-5-naphthol-7-sulphonic acid or by the mixed urea from 2-amino-5-naphthol-7-sulphonic acid and ammonia or a substituted or unsubstituted arylamine, dyestuffs are obtained possessing similar properties.

Example 2

86.8 parts by weight of the sodium salt of the dyestuff o-toluidine-disulphonic-acid-azo-1-naphthyl-amino-7-sulphonic-acid-azo-1-amino-2-naphthol-ethyl-ether-6-sulphonic acid are diazotized and coupled with 35.5 parts by weight of m-amino-phenyl-1.2-naphthimidazol-5-hydroxy-7-sulphonic acid in an ice cold solution of 50 parts of water and 100 parts by weight of pyridine. When the coupling is complete the dyestuff is worked up in the customary manner.

The finished dyestuff, having most probably the formula:

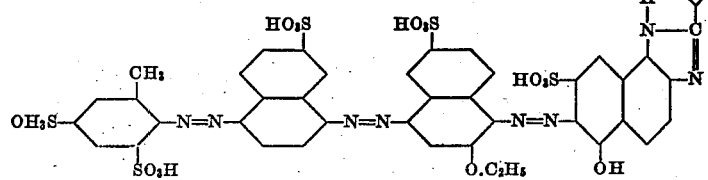

dissolves in concentrated sulfuric acid with a cornflower blue coloration, and upon careful reduction with stannous chloride and hydrochloric acid, yields:
o-toluidine-disulfonic acid,
1.4-naphthalenediamine-7-sulfo acid,
1.4-diamino-2-naphthol-ethyl-ether-6-sulfonic-acid, and
m-amino-phenyl-1.2-naphthimidazol-6.5-aminonaphthol-7-sulfonic-acid.

It dyes cotton blueish green shades.

The above dyestuff can be diazotized on the fiber and developed with methylphenyl pyrazolone, when a fast green shade results. The latter dyestuff, developed upon the fiber, most probably has the formula:

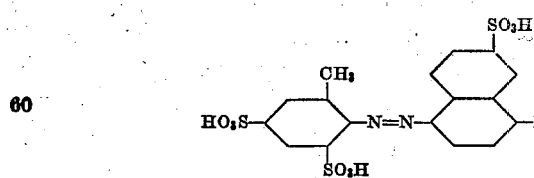 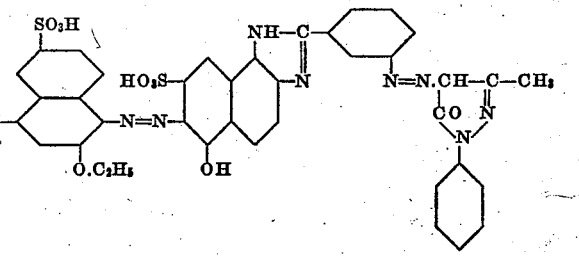

Example 3

75.1 parts by weight of the sodium salt of the dyestuff o-sulphanilic-acid-azo-1-naphthylamine-7-sulphonic-acid-azo-1-amino-2-naphthol-ethyl-ether-6-sulphonic-acid are diazotized and coupled with 35.8 parts by weight of m-aminobenzoyl-2-amino-5-naphthol-7-sulphonic-acid in the presence of 50 parts of water and 100 parts by weight of pyridine, the whole being maintained ice cold. The dyestuff is worked up in the customary manner and possesses the properties of the product described in Example 2. The finished product most probably has the formula:

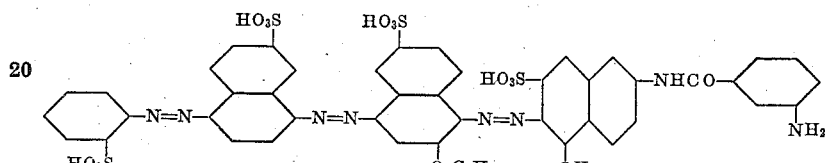

Dyestuffs having similar properties to those of the dyestuff of the foregoing example are obtainable by replacing the m-aminobenzoyl-2-amino-5-naphthol-7-sulphonic-acid by the p-aminobenzoyl-2-amino-5-naphthol-7-sulphonic-acid or by m- or p-aminophenyl-5-hydroxy-1.2-naphthothiazol-7-sulphnoic-acids or by the m- or p-amino-benzoyl-aminobenzoyl-5-naphthol-7-sulphonic-acids.

I claim:

1. Process for the production of trisazo dyestuffs involving the coupling, in the presence of pyridine, of the diazo compound of a secondary disazo dyestuff containing 1-amino-2-naphthol-ethyl ether-6-sulfonic acid in the end position with a derivative of 2-amino-5-naphthol-7-sulfonic acid, characterized in that the said derivative of 2-amino-5-naphthol-7-sulfonic acid is a compound having the general formula:

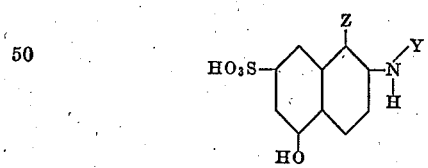

wherein Z represents hydrogen or the second heterocyclic atom in one of the grouping thiazole or diazole in which the nitrogen atom in the 2-position is the first heterocyclic atom, and in which Y represents one of the residues, alkyl, aralkyl, aroyl, aminoaryl or the carbon atom of the thiazole or diazole ring.

2. Process for the production of trisazo dyestuffs involving the coupling, in the presence of pyridine, of the diazo compound of a secondary disazo dyestuff having the general formula:

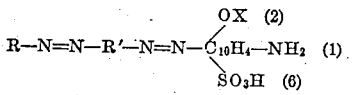

wherein R and R' represent residues of the benzene or naphthalene series respectively or their sulfonic acids and X represents alkyl, with a derivative of 2-amino-5-naphthol-7-sulfonic acid, characterized in that the said derivative of 2-amino-5-naphthol-7-sulfonic acid is a compound having the general formula:

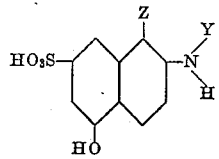

wherein Z represents hydrogen or the second heterocyclic atom in one of the grouping thiazole or diazole in which the nitrogen atom in the 2-position is the first heterocyclic atom, and in which Y represents one of the residues, alkyl, aralkyl, aroyl, aminoaryl or the carbon atom of the thiazole or diazole ring.

3. The herein described new trisazo dyestuffs having most probably the general formula:

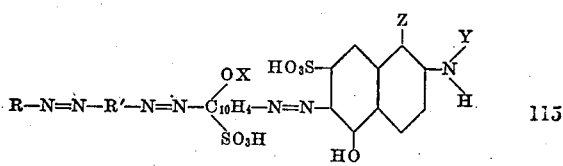

wherein R and R' represent residues of the benzene or naphthalene series respectively or their sulfonic acids, X represents alkyl, Z represents hydrogen or the second heterocyclic atom in one of the grouping thiazole or diazole in which the nitrogen atom in the 2-position is the first heterocyclic atom, and in which Y represents one of the residues, alkyl, aralkyl, aroyl, aminoaryl or the carbon atom of the thiazole or diazole ring, which dyestuffs are soluble in concentrated sulfuric acid generally with from blue to bluish green colorations; dyeing cotton generally from blue to green shades.

4. The herein described new trisazo dyestuffs having most probably the general formula:

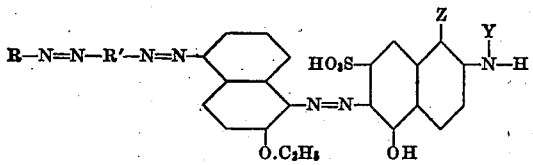

wherein R and R' represent residues of the benzene or naphthalene series respectively or their sulfonic acids, Z represents hydrogen or the second heterocyclic atom in one of the grouping thiazole or diazole in which the nitrogen atom in the 2-position is the first heterocyclic atom, and in which Y represents one of the residues, alkyl, aralkyl, aroyl, aminoaryl or the carbon atom of the thiazole or diazole ring, which dyestuffs are soluble in concentrated sulfuric acid generally with from blue to bluish green colorations; dyeing cotton generally from blue to green shades.

5. The herein described new trisazo dyestuff having most probably the general formula:

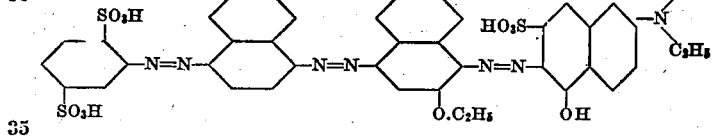

which dyestuff is readily soluble in concentrated sulfuric-acid with a blue coloration, yielding upon careful reduction with stannous chloride and hydrochloric acid aniline-3.6-disulfonic-acid, 1-4-naphthylenediamine, 1-4-diamino-2-naphthol-ethyl-ether-6-sulfonic-acid, and 2-ethylamino-5-hydroxy-6-naphthylamine-7-sulfonic-acid; dyeing cotton clear greenish blue shades of good fastness properties.

In testimony whereof, I affix my signature.
HUGO SCHWEITZER.